United States Patent Office 2,726,271
Patented Dec. 6, 1955

2,726,271
PROCESS FOR CONVERTING POLYCHLOROBENZENES

James E. Troyan, Lewiston, and Walter W. Northgraves, Kenmore, N. Y., assignors to Olin Mathieson Chemical Corporation, a corporation of Virginia No Drawing. Application October 18, 1951, Serial No. 251,984

7 Claims. (Cl. 260—650)

Our invention relates to a process for the removal of chlorine atoms from the ring of polychlorobenzenes having four or more chlorine atoms per molecule, particularly vicinal tetrachlorobenzene and pentachlorobenzene, and the substitution of hydrogen for the chlorine removed.

In the chlorination of benzene to obtain symmetrical tetrachlorobenzene (1, 2, 4, 5), benzene or its lower chlorination products may be chlorinated substantially to a tetrachloro stage and either without or after fractional distillation chilled to obtain tetrachlorobenzenes. When the crude mixture or the tetrachloro fraction is chilled, 1,2,4,5-tetrachlorobenzene separates as a solid. It may be removed in any suitable manner such as by filtration, centrifuging or the like and the solid washed, sweated or recrystallized as necessary to obtain the symmetrical 1,2,4,5-tetrachlorobenzene in a suitably pure state. The filtrates from the separation of the symmetrical tetrachlorobenzene contain large amounts of vicinal 1,2,3,4-tetrachlorobenzene which has only limited uses. These filtrates comprising largely vicinal tetrachlorobenzene are particularly suitable feed materials for our process, for our process provides an advantageous method whereby vicinal tetrachlorobenzene may be converted readily into a large proportion of 1,2,4-trichlorobenzene, which, on rechlorination, forms additional quantities of 1,2,4,5-tetrachlorobenzene. The 1,2,4,5 isomer of tetrachlorobenzene is more valuable because of its use as a starting material in the production of such materials as 2,4,5-trichlorophenoxyacetic acid and derivatives.

In the prior art of dechlorinating polychlorobenzenes, hydrogen has been used in conjunction with a nickel catalyst at elevated temperatures to effect the dechlorination. We have discovered a simpler and cheaper process for accomplishing this conversion.

In our process we vaporize the polychlorobenzenes and admix the vapors with steam. This mixture is passed at an elevated temperature over a catalyst characterized by the fact that it contains copper oxides or chlorides as an active component.

The valance state of the copper contained in the catalyst is usually not known and may be in a process of change from time to time. Copper oxides and chlorides or other compounds of copper which are converted by activation or under the conditions of use to these oxides or chlorides can be used as starting materials in the preparation of suitable catalysts. Cupric nitrate, cupric carbonate, or cupric chloride, may be used. Any of the known techniques of carrying out catalytic reactions may be used including the use of bulk catalysts, mechanical mixtures of catalysts with inert solid diluents, or catalysts supported on various substrates. Suitable supports include silica-alumina, diatomaceous earth and the like.

We dilute the polychlorobenzene vapors with steam in a ratio of feed to steam by weight of from about 1:0.05 to 1:10 and within this range we prefer to use from about 1:0.1 to 1:5. While the use of more than ten parts of steam to one part of feed may serve to decrease the always concomitant carbonization, it adds to the cost of carrying out the reaction because of the increase in throughput required for the dechlorination of the same amount of feed. When the feed rate is in the preferred range of 1:0.1 to 1:5, space velocities of about 0.2 to 2 sec.$^{-1}$ are preferred. Lower space velocities may give higher conversions but do so at the cost of increased carbonization and substantially higher space velocities give lower conversions requiring more recycling.

The mixture of polychlorobenzene vapors and steam is passed over the selected catalyst at temperatures of about 350–500° C. When the temperature is higher than that giving a reasonable conversion, formation of carbon and other byproducts tends to be excessive. At lower temperatures the reaction may be undesirably slow.

The dechlorination of the polychlorobenzene feed is obtained by passing the vaporized feed in admixture with steam in a weight ratio of feed to steam in the range of about 1:0.05 to 1:10 over a catalyst which contains copper oxides or chlorides as an active component at an elevated temperature in the range of about 350° to 500° C. Substantially no dechlorination occurs either in the absence of a catalyst or in the presence of other catalysts, e. g., Activated Alumina, but otherwise under similar conditions as illustrated by the following examples.

Example I

A feed stock comprising approximately 2% of mixed trichlorobenzenes, 13% of symmetrical tetrachlorobenzene, 71% of vicinal tetrachlorobenzene and 14% of pentachlorobenzene was passed through the empty catalyst tube at a temperature of 448° C. and a space velocity of 1.99 sec.$^{-1}$. The feed rate was 1.47 grams per minute of the feed stock together with 4.19 grams per minute of steam. The product comprised about 3% of trichlorobenzenes, 13% of symmetrical tetrachlorobenzene, 74% of vicinal tetrachlorobenzene and 11% of pentachlorobenzene.

Example II

The same feed as in Example I was introduced at the rate of 1.98 grams per minute together with 4.26 grams per minute of steam through an empty catalyst tube at 464° C. and a space velocity of 2.05 sec.$^{-1}$. The product comprised 1.5% of mixed trichlorobenzenes, 12.5% of symmetrical tetrachlorobenzene, 70% of vicinal tetrachlorobenzene and 14% of pentachlorobenzene.

Example III

A feed comprising about 0.25% of trichlorobenzenes, 9.2% of symmetrical tetrachlorobenzene, 77.9% of vicinal tetrachlorobenzene and 12.7% of pentachlorobenzene was passed at the rate of 2.43 grams per minute together with 4.27 grams per minute of steam through a catalyst tube packed with active alumina. The temperature was 452° C. and the space velocity was 2.07 sec.$^{-1}$. The product comprised approximately 4% of trichlorobenzenes, 9.5% of symmetrical tetrachlorobenzene, 75% of vicinal tetrachlorobenzene and 11% of pentachlorobenzene.

The following examples will illustrate the particularly useful application of our process to the dechlorination of vicinal tetrachlorobenzene and pentachlorobenzene. As illustrated by the examples, the polychlorobenzene feed material may be a mixture of polychlorobenzenes having four or more chlorine atoms per molecule.

Example IV

In this case the feed contained 69% vicinal tetrachlorobenzene, 13% symmetrical tetrachlorobenzene, 11% of pentachlorobenzene and 1% of 1,2,4-trichlorobenzene. The catalyst was prepared by soaking active alumina (about 4–12 mesh) in a 61% solution of $Cu(NO_3)_2 \cdot 3H_2O$ for 3 hours, draining and air drying. The impregnated alumina was roasted in an oven at 350–400° C. before use. The fresh catalyst contained about 9.2% of copper. About 1.2 grams per minute of the vaporized feed admixed with 3.1 grams per minute of steam was passed over the catalyst in a 1.5 inch diameter Monel tube at a temperature of about 365° C. and a space velocity of 1.25 sec.$^{-1}$. The product contained 41% of vicinal tetrachlorobenzene and 22% of 1,2,4-trichlorobenzene indicating that 41% of the original vicinal tetrachlorobenzene was dechlorinated and that about 89% of this was converted to 1,2,4-trichlorobenzene. The proportions of symmetrical tetrachlorobenzene and pentachlorobenzene were little changed.

*Example V*

Using the same catalyst as in Example IV and a feed stock containing about 76.5% of vicinal tetrachlorobenzene, 9% of 1,2,4,5-tetrachlorobenzene, 0.25% of trichlorobenzenes, and 12.5% of pentachlorobenzene, a product was obtained which contained only 24% of vicinal tetrachlorobenzene and contained 41% of 1,2,4-trichlorobenzene. The amounts of 1,2,4,5-tetrachlorobenzene and pentachlorobenzene were little changed. The feed was introduced at the rate of 1.53 grams per minute and steam at the rate of 4.38 grams per minute. The space velocity was 2.05 sec.$^{-1}$. The temperature in the reaction chamber was about 460° C. In this case 69% of the vicinal tetrachlorobenzene was dechlorinated and of this about 92% was converted into 1,2,4-trichlorobenzene.

*Example VI*

A catalyst was prepared by soaking 4–12 mesh active alumina in a 55% solution of CuCl$_2$.2H$_2$O for 4 hours, draining and air drying. The catalyst was charged to the reactor tube and roasted before dechlorination was started. Using the feed stock of Example V introduced as a vapor at the rate of 1.75 grams per minute diluted with steam at the rate of 7.92 grams per minute and passed over the catalyst at a temperature of 451° C. and a space velocity of 1.96 sec.$^{-1}$, a product was obtained which contained about 45% of vicinal tetrachlorobenzene and 29% of 1,2,4-trichlorobenzene. When the feed rate was reduced to 1.07 grams per minute and the steam rate to 4.13 grams per minute, using the same temperature and a space velocity of 1.96 sec.$^{-1}$, the product contained only 25% of vicinal tetrachlorobenzene and 46% of 1,2,4-trichlorobenzene. In both cases the amounts of symmetrical tetrachlorobenzene were little changed. The pentachlorobenzene present was reduced to about 6%.

*Example VII*

Using a feed stock containing 72% of vicinal tetrachlorobenzene, 12% of symmetrical tetrachlorobenzene, 2% of trichlorobenzenes and about 11% of pentachlorobenzene with the same catalyst as in the preceding example, a vaporized feed rate of 1.93 grams per minute, a steam rate of 4.13 grams per minute, a temperature of 354° C., and a space velocity of 1.73 sec.$^{-1}$, a product was obtained which contained 44% of vicinal tetrachlorobenzene, 16% of 1,2,4-trichlorobenzene, and about the same amount of symmetrical tetrachlorobenzene as the feed.

*Example VIII*

When a mixture of about 83% of vicinal tetrachlorobenzene, 15% of symmetrical tetrachlorobenzene, and substantially no 1,2,4-trichlorobenzene was vaporized and admixed at the rate of 3.2 grams per minute with 0.35 gram per minute of steam and passed over the catalyst of Example VI at a temperature of 457° C. and a space velocity of 0.29 sec.$^{-1}$, a product was obtained which contained 32% of vicinal tetrachlorobenzene, 13% of symmetrical tetrachlorobenzene, 37% of 1,2,4-trichlorobenzene and 4% of 1,2,3-trichlorobenzene. At a temperature of 439° C. with the feed rate decreased to 1.27 grams per minute, the steam rate maintained at 0.35 gram per minute, and the space velocity reduced to 0.205 sec.$^{-1}$, the product contained 52% of 1,2,4-trichlorobenzene, 7% of 1,2,3-trichlorobenzene, 11% of symmetrical tetrachlorobenzene, and only 19% of vicinal tetrachlorobenzene.

*Example IX*

A vertical catalyst bed was prepared by charging a tube with 80 grams of fused crushed cupric chloride above 190 grams of active alumina. A feed containing 72% of vicinal tetrachlorobenzene, 12% of symmetrical tetrachlorobenzene, 2% of mixed trichlorobenzenes and 11% of pentachlorobenzene was passed downward through the catalyst bed as a vapor at the rate of 1.35 grams per minute admixed with 3.97 grams per minute of steam. The temperature was 452° C. and the space velocity was 1.9 sec.$^{-1}$. The product contained 35% of vicinal tetrachlorobenzene, 13% of symmetrical tetrachlorobenzene, 32% of 1,2,4-trichlorobenzene, and about 9% of pentachlorobenzene.

*Example X*

About 300 grams of pentachlorobenzene was dechlorinated by passing it over the catalyst of Example VI at a temperature of about 440°–450° C., at a rate of 1.56 grams per minute of pentachlorobenzene vapor admixed with 3.74 grams per minute of steam. The 285.9 grams of product contained about 53% of pentachlorobenzene, 16.5% of 1,2,4,5-tetrachlorobenzene, and 9% of 1,2,3,4-tetrachlorobenzene.

We claim:

1. A process for the partial dechlorination of a mixture of polychlorobenzenes having at least four chlorine atoms per molecule comprising predominantly polychlorobenzenes selected from the class consisting of vicinal tetrachlorobenzene and pentachlorobenzene and in which at least part of the vicinal tetrachlorobenzene is converted to 1,2,4-trichlorobenzene and at least part of the pentachlorobenzene is converted to 1,2,4,5-tetrachlorobenzene which comprises vaporizing the polychlorobenzene feed, admixing the polychlorobenzene vapors with steam in a weight ratio of polychlorobenzene to steam in the range of about 1:0.05 to 1:10, and passing the vapor mixture over a catalyst comprising a material selected from the class consisting of copper oxides and copper chlorides at a temperature in the range of about 350° to 500° C.

2. A process for treating a mixture of polychlorobenzene having at least four chlorine atoms per molecule comprising predominantly polychlorobenzenes selected from the class consisting of vicinal tetrachlorobenzene and pentachlorobenzene and in which at least part of the vicinal tetrachlorobenzene is converted to 1,2,4-trichlorobenzene and at least part of the pentachlorobenzene is converted to 1,2,4,5-tetrachlorobenzene which comprises vaporizing the polychlorobenzene feed, admixing the polychlorobenzene vapors with steam in a weight ratio of polychlorobenzene to steam in the range of about 1:0.1 to 1:5, and passing the vapor mixture over a catalyst comprising a material selected from the class consisting of copper oxides and copper chlorides at a temperature in the range of about 350° to 500° C. and a space velocity in the range of about 0.2 to 2 sec.$^{-1}$.

3. The process of claim 1 in which at least a major portion of the polychlorobenzene feed is vicinal tetrachlorobenzene.

4. The process of claim 1 in which at least a major portion of the polychlorobenzene feed is pentachlorobenzene.

5. The process of claim 2 in which at least a major portion of the polychlorobenzene feed is vicinal tetrachlorobenzene.

6. The process of claim 2 in which at least a major portion of the polychlorobenzene feed is pentachlorobenzene.

7. The process of converting 1,2,3,4-tetrachlorobenzene to 1,2,4-trichlorobenzene which comprises vaporizing a polychlorobenzene mixture comprising predominantly 1,2,3,4-tetrachlorobenzene, mixing the resulting vapors with steam in a weight ratio to steam in the range of about 1:0.05 to 1:10, and passing the vapor mixture at a temperature in the range of about 350° to 500° C. over a catalyst comprising a material selected from the group consisting of copper oxides and copper chlorides carried on active alumina.

References Cited in the file of this patent

Calingaert et al.: "Jour. Am. Chem. Soc.," vol. 61, pages 2748–54 (1939).

Akademii Nauk. S. S. R. Izvestia Od. Khim. No. 4; pages 439–446 (1946).